Patented Feb. 23, 1926.

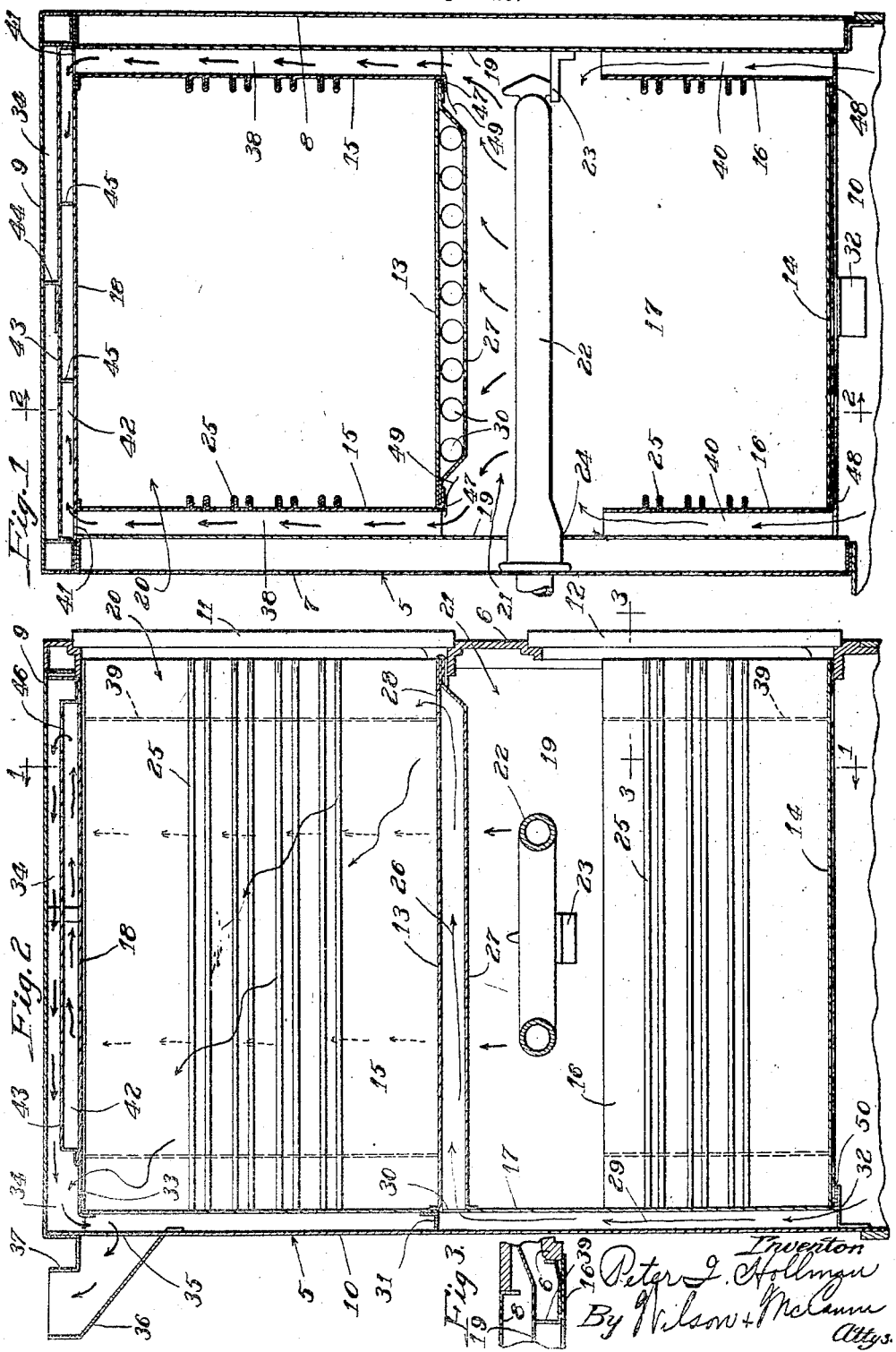

1,573,941

UNITED STATES PATENT OFFICE.

PETER I. HOLLMAN, OF ROCKFORD, ILLINOIS, ASSIGNOR TO GEO. D. ROPER CORPORATION, OF ROCKFORD, ILLINOIS, A CORPORATION OF ILLINOIS.

OVEN CONSTRUCTION.

Application filed September 28, 1925. Serial No. 59,035.

*To all whom it may concern:*

Be it known that I, PETER I. HOLLMAN, a citizen of the United States, residing at Rockford, in the county of Winnebago and State of Illinois, have invented certain new and useful Improvements in Oven Constructions, of which the following is a specification.

This invention relates to stoves in general and more particularly to gas ranges of the double oven type.

The principal object is to provide a gas range embodying a novel oven construction providing for the ventilation of the baking oven, the uniform heating thereof, and generally more efficient operation.

Another object is to provide an oven construction facilitating the initial assembling and permitting complete disassembling by the user, of all of the oven insides including oven bottoms, side linings, and back, top, and side flues for cleaning and inspection, and replacement or repair.

Another object is to provide an oven construction in which all of the inside elements are securely held without the necessity of any bolting thereof, with a view to simplicity and more economical construction aside from the advantages derived thereby of easy assembling and disassembling.

These and other objects and advantages of the invention are discussed more fully in the following specification in which reference is made to the accompanying drawing, wherein—

Fig. 1 is a vertical, transverse section through the double oven section of a gas range incorporating the improvements of my invention. This view is taken on the line 1—1 of Fig. 2;

Fig. 2 is a longitudinal, vertical section through the ovens and is taken on the line 2—2 of Fig. 1; and Fig. 3 is a fragmentary, sectional detail taken on the line 3—3 of Fig. 2.

All of the sections are taken looking in the direction of the small arrows.

The oven construction illustrated comprises a shell or jacket designated generally by the reference numeral 5 comprising a cast front frame 6, sheet metal side walls 7 and 8, and top and back walls 9 and 10, respectively. Any suitable or preferred construction may be used in the shell or jacket. The front frame 6 provides jambs for a baking oven door 11 and a broiler oven door 12, in the usual manner. Referring to the parts in a general way, for the present, the oven insides consist of a baking oven bottom 13 and a broiler oven bottom 14 supported, respectively, by side linings 15 and 16 at opposite sides, and at the front by the frame 6. The back flue 17 supports a top flue 18 at its inner end, the latter being supported at opposite sides by side flues 19. The flues 19 are in the nature of false flues inasmuch as they actually constitute insulating walls, as will presently appear. The construction thus far described provides a baking oven 20 and a broiler oven 21. In the broiler oven is mounted an oven burner 22 supported from the sides of the oven in any suitable or preferred manner such, for example, as by means of a bracket 23 at one side of the oven and by bearing in openings in the side wall 7 and side flue 19, as appears at 24. Oven racks or trays may be mounted in both of the ovens on the ledges 25 provided on the side linings 15 and 16, in the usual manner.

The baking oven bottom 13 provides a flue duct 26 by virtue of a spaced bottom wall 27. The flue duct 26 communicates at its forward end with the baking oven 20 through a series of ports 28. It is also in communication with the flue duct 29 of the back flue 17 through a series of ports 30 provided in the wall of the back flue 17. The flue duct 29 is closed at its upper end by a wall 31 extending crosswise of the ovens above the openings 30 and serving as a spacing medium for the back flue 17. The flue 17, it will be noted, is supported at its bottom end on a bracket 32, spot-welded or otherwise suitably secured to the back wall 10 of the oven shell. The top flue 18 has openings 33 at the inner end of the baking oven 20 communicating with a flue duct 34 which, in turn, communicates with a stack vent 35 provided in the back wall 10 leading into a neck 36 having the usual flue collar 37 thereon. From the description thus far, it will appear that fresh, clean air enters from beneath the ovens through the duct 29 and the duct 26 into the baking oven 20 at the front end thereof. In the course of its passage up to the openings 28 and particularly while passing through the duct 26, the fresh air is intensely heated and thereby purified. On entering the oven, it tends to rise naturally and circulates about the baking and roasting dishes on the racks in the oven 20. The circulation is of the utmost importance in preserving the quality of the food and preventing a shrinkage thereof, as experiment has shown that foods prepared in this type of oven lose less in weight and retain to a much greater degree their natural flavors than if prepared in any other type of oven. This is due entirely to the circulation of fresh, hot air instead of relying upon dry radiated heat that is used in unventilated ovens. The course of the fresh air is indicated by the long, wavy arrows and is shown to be generally diagonally across the oven space from the front at the bottom of the oven to the back at the top thereof from which point it is ultimately allowed to escape through the vent 35, there being a natural draft induced by a chimney in the usual manner. Obviously, there is a continuous changing of pure, fresh air in the oven. The oven is uniformly heated. There are no over-heated spots or cold corners. The food placed in the oven for baking or roasting is thoroughly done on all sides. Furthermore, the oven operates more economically by the present method since practically all of the heat generated at the burners is utilized and very little heat is lost in radiation. Aside from the heat absorbed while passing directly over the oven burners 22 in the flue 26, the entering air absorbs practically all of the heat which would otherwise be radiated from the rear wall of the broiler when it passes through the duct 29. This extra heat, which was otherwise entirely wasted, brings up the efficiency of the oven an appreciable degree.

The products of combustion from the burners 22 take the course indicated by the short arrows in the drawing. They come first into contact with the flued oven bottom 13 and are deflected and pass upwardly around the sides of the oven 20 through ducts 38 provided behind the side linings 15. The latter are spaced from the side flues 19 by channel-shaped members 39 spot welded or otherwise suitably secured to the side linings. Fresh oxygen-laden air for the burners is supplied through ducts 40 provided behind the side linings 16 in the broiler oven 21. The side linings 16 are also kept spaced from the side flues 19 by channel-shaped spacers 39 spot-welded or otherwise suitably secured thereto. The form of these spacers is shown in Fig. 3. The combustion products leave the ducts 38 through a series of openings 41 provided in the top flue 18 leading into a duct 42 provided by a spaced wall 43 on the inside wall of the flue 18. The wall 43 is spaced from the top wall 9 of the oven shell by angular brackets 44, spot-welded or otherwise suitably secured to the top of the wall 43. The wall 43 is also spaced from the wall of the flue 18 by small down-turned tongues 45 suitably struck form the metal of the wall 43. The duct 42 communicates at its forward end, by way of openings 46, with the duct 34 which, as previously described, exhausts at the rear-wear end of the oven through the stack vent 35. It will be apparent that the heat from the burners 22 is absorbed in the oven to a maximum degree before the waste products of combustion are expelled through the vent 35 and that the heating is, furthermore, substantially uniform. In passing around the sides of the oven, the combustion products being in direct contact with the side linings 15, communicate approximately as much heat to these walls as is given to the oven bottom 13. In earlier types of stoves, the oven bottom was usually the hottest part of the oven due to its proximity with the burners. In the present case, however, the incoming fresh air absorbs a certain portion of the heat and the oven bottom is substantially at the same temperature as the sides of the oven. On entering the flue duct 42, the combustion products are conducted entirely to the front of the oven before they are allowed to escape by passing rearwardly the length of the oven and through the vent 35. The indirect passage of the products affords an opportunity for the oven to absorb a further considerable portion of the heat therefrom and the top is maintained at about the same temperature as the sides and bottom of the oven. The waste products of combustion, it will be seen, are carried away by the same induced draft as the circulating fresh air that passes through the oven. There is no opportunity for an entry of combustion products into the oven since the place where the fresh air is allowed to escape from the oven is situated, as described, at a point where there is an induced draft tending to carry away the combustion products.

The oven is constructed with a view, first of all, to ease in assembling and, furthermore, with a view to enabling the user to dismantle the oven insides without series difficulty for the purpose of cleaning and inspection, and replacement or repair. For this reason, the inside elements provide mutual support for one another without the intermediary of bolts or screws. For example, the baking oven bottom 13 is supported on ledges 47 provided at the bottom of the side linings 15. In a similar manner, the broiler oven bottom 14 is carried on ledges 48 on the side linings 16. The side linings 15 are, in turn, supported by the front frame 6 and at their inner ends on struck up "eyebrows" 49 provided on the wall of the back flue 17. The shoulders or ledges provided by the eyebrows 49 are in the form of cam surfaces, as appears in Fig. 1, which serve to wedge the linings 15 into tight contact at their inner ends with the top flue 18, when the linings are inserted in the oven. Thus the linings are engaged at their outer end at the front of the oven and swung into place laterally when the cam projections provided at 49 serve to draw the same up into snug contact with the top flue and thus seal the oven against the possibility of waste products of combustion contaminating the oven. The bottom side linings 16 are supported, as most clearly appears in Fig. 2, at the front by the frame 6 and at the back by a ledge 50 provided on the back flue 17. It will appear thus far that the oven bottoms 13 and 14 are first removable and then the side linings 15 and 16. After the side linings are removed, the back flue 17 is removable. This, in turn, holds the side flues 19 in place so that the side flues 19 are next removable. There then remains the top flue 18 which, as previously stated, is normally supported by the back flue 17 and the side flues 19. The top flue is, of course, free the moment the side flues are removed and will drop down and may be taken from the oven. It will be noted that the back and side flues are provided in one piece from top to bottom of the ovens 20 and 21 which is of advantage not only in reducing the cost of production, but also in facilitating the assembling and disassembling.

I claim:

1. In an oven construction, the combination of a closed oven space, burners therebeneath, flue ducts for conducting the products of combustion around the sides of the oven space out of communication with said space, top flue ducts for receiving said combustion products for passage back and forth for indirect discharge thereof, a stack vent for the ultimate discharge of said combustion products, a fresh air flue duct for said oven, inlets for the fresh air at the bottom of the oven at one side thereof, and outlets for the air at the top of the oven at the opposite side thereof from the inlets, said outlets leading in common with the top flue ducts for waste combustion products to said stack vent.

2. In an oven construction, the combination of a closed oven space, means for heating the same, means for conducting fresh air to said oven for entry at the bottom thereof at one side and discharge therefrom at the top thereof at the opposite side from the inlets, and separate means for conducting the products of combustion from said heating means about said oven space.

3. In an oven construction, the combination of a closed oven space, a flued oven bottom, oven burners beneath said oven space, and means for conducting fresh air to said oven through said flued oven bottom over the burners therebeneath to the front end of the oven and for discharging said fresh air at the top of the oven at the back end thereof.

4. In an oven construction, the combination of a closed oven space, an oven burner therefor, flue ducts for conducting the products of combustion from said burners about said oven, a stack vent providing a source of induced draft for the ultimate discharge of said combustion products, and means for conducting fresh air to the bottom of said oven at one side thereof and for discharging the air at the top of said oven at the opposite side thereof, the discharge point being situated adjacent said stack vent.

5. In an oven construction, the combination of a closed oven space, an oven burner therefor, flue ducts for conducting the products of combustion from said burner about said oven, a stack vent at the back and upper end of said oven providing a source of induced draft for the ultimate discharge of said combustion products, and means for conducting fresh air from the back of said oven space to the front thereof over said burner to enter the oven at the bottom and front end thereof and for discharging the same at the back and upper end thereof, the discharge point being adjacent the stack vent.

6. In an oven construction, the combination of a closed oven space, a burner therebeneath, flue ducts for conducting the products of combustion about said oven space, a stack vent for the ultimate discharge of said combustion products, and means for conducting fresh air from one end of the oven to the opposite end across the bottom over the burners to enter the oven at one end at the bottom thereof and for discharging said air at the top at the opposite end of said oven whereby to induce a diagonal ventilating current from one end at the bottom to the opposite end at the top, the discharge point for the exhausting of the air communicating with said stack vent.

7. In an oven construction, the combination of a closed baking oven space, a broiler oven space therebeneath, an oven burner in the last-mentioned space beneath said baking oven, flue ducts for conducting the products of combustion from said burners about said baking oven space, a stack vent for the ultimate discharge of said combustion products, and means for conducting fresh air across the back wall of said broiler oven space and forwardly across the bottom of said baking oven over said oven burner for entry into said oven at the front end and bottom thereof and for discharging the same from said oven at the back end and top thereof, the discharge communicating with said stack vent.

8. In an oven construction, the combination of a closed baking oven space, a broiler oven space therebeneath, a burner in said broiler oven space beneath said baking oven space, flue ducts for conducting the products of combustion from said burner around the sides of said baking oven space, top flue ducts for conducting the combustion products the length of the oven space in reverse directions, a stack vent at the back and upper end of said oven for the ultimate discharge of said combustion products, a flue duct extending across the back of said broiler oven space for conducting fresh air from beneath said oven space to the top thereof, and a communicating flue duct extending across the bottom of the baking oven space for further conducting the fresh air from the back to the front of said ovens over said burner for discharge into said baking oven at the bottom and front end thereof, said fresh air being discharged from said baking oven at the top and back end thereof into said stack vent.

9. In an oven construction, a shell comprising enclosing walls and a front frame providing an oven door jamb, an oven bottom, side linings supporting the same, a back flue, said back flue and front frame serving to support said side linings, said flues held in place by said back flue, and a top flue supported by said back and side flues.

10. In an oven construction, a shell comprising top, back, and side walls and a front frame providing door jambs for baking and broiler ovens, oven bottoms for the baking and broiler ovens, side linings for supporting the same in said baking and broiler ovens, a back flue extending the combined height of said ovens, said back flue and front frame serving to support said side linings, side flues extending the combined height of said ovens and held in place by said back flue, and a top flue supported by said back and side flues.

11. In an oven construction, an oven shell comprising top, back, and side walls, and a front frame providing an oven door jamb, top, back, and side flues in said oven, a removable oven bottom and a pair of removable side linings for supporting the same, said side linings being supported at their inner ends on embossed cam-shaped ledges provided on said back flue arranged for wedging said side linings into snug contact at the top end thereof with said top flue.

12. In an oven construction, the combination of a shell comprising top, back, and side walls and a front frame for providing oven door mountings, a back flue in said oven open at the bottom thereof, a flued oven bottom open at its inner end to communicate with said back flue, said back flue having openings in the wall thereof to register with said flued oven bottom, and said oven bottom having openings at its forward end communicating with the baking oven at the bottom and front end thereof, a top flue having an opening at the inner end thereof communicating with the baking oven at the top and back end thereof, and a stack vent communicating with said top flue.

In witness of the foregoing I affix my signature.

PETER I. HOLLMAN.

Certificate of Correction.

It is hereby certified that in Letters Patent No. 1,573,941, granted February 23, 1926, upon the application of Peter I. Hollman, of Rockford, Illinois, for an improvement in "Oven Constructions," errors appear in the printed specification requiring correction as follows: Page 2, line 114, for the word "series" read *serious;* page 4, line 28, claim 9, for the word "said," second occurrence, read *side;* and that the said Letters Patent should be read with these corrections therein that the same may conform to the record of the case in the Patent Office.

Signed and sealed this 23d day of March, A. D. 1926.

[SEAL.]                                M. J. MOORE,
*Acting Commissioner of Patents.*